United States Patent [19]
Propst et al.

[11] 3,807,472
[45] Apr. 30, 1974

[54] SHEAR MECHANISM FOR TIMBER HARVESTING MACHINE

[76] Inventors: Robert L. Propst, 2347 Londonderry Ave., Ann Arbor, Mich. 48104; Howard B. Propst, P.O. Box 3162, Jekyll Island, Ga. 48106

[22] Filed: Apr. 19, 1972

[21] Appl. No.: 245,507

[52] U.S. Cl.............................................. 144/34 E
[51] Int. Cl............................................... A01g 23/08
[58] Field of Search................. 144/3 D, 34 R, 34 E

[56] References Cited
UNITED STATES PATENTS

| | | | |
|---|---|---|---|
| 2,529,934 | 11/1950 | Gracey et al. | 144/34 E |
| 2,565,252 | 8/1951 | McFaull | 144/34 E |
| 3,601,169 | 8/1971 | Hamilton | 144/34 R |

Primary Examiner—Gerald A. Dost
Attorney, Agent, or Firm—Olsen & Stephenson

[57] ABSTRACT

A shear mechanism for mounting on the forward end of a forwardly movable vehicle comprising a forwardly extending generally horizontal main frame having a rearwardly extending opening in the front end thereof to provide rigid support for a pair of shear blades pivotally mounted on the frame on opposite sides of the opening. The opening in the frame is of predetermined width to limit the size of tree that can enter the opening and the shear blades have cutting edges which are located within the opening both in the open and closed positions of the blades. A power assist mechanism is provided for insuring the desired cutting action of the blades on a tree and in one form of the invention the cutting edges of the blades are of a particular serrated construction to combine a fiber spreading and shearing action on a tree being cut.

7 Claims, 6 Drawing Figures

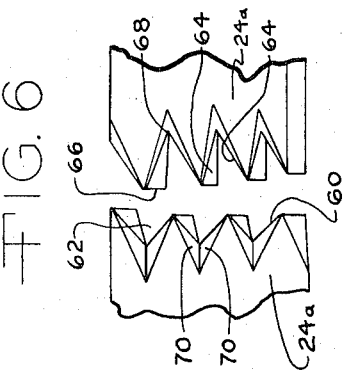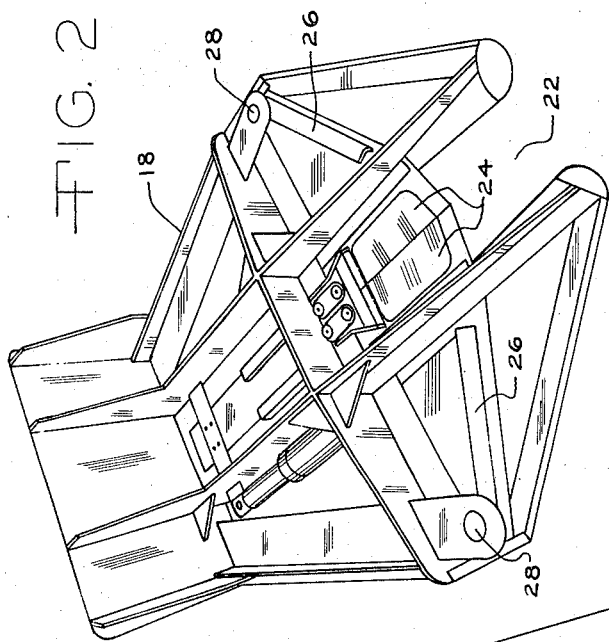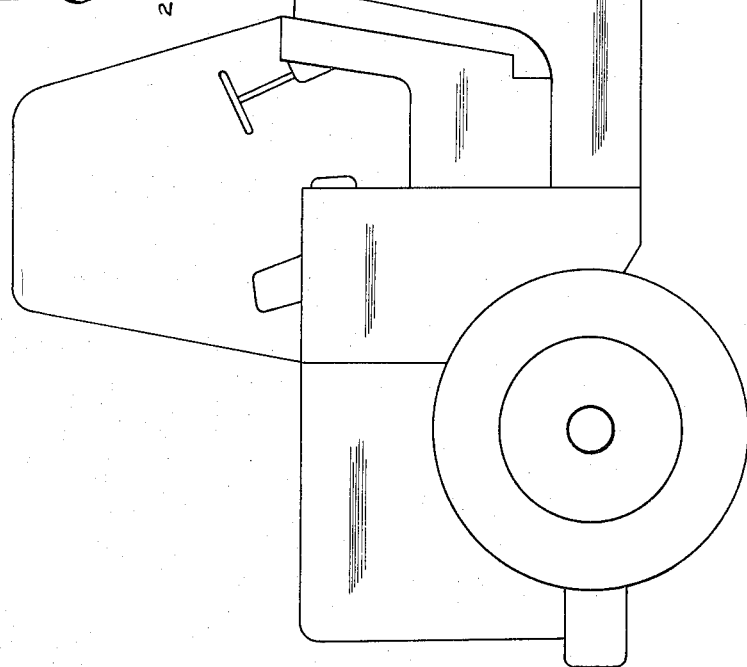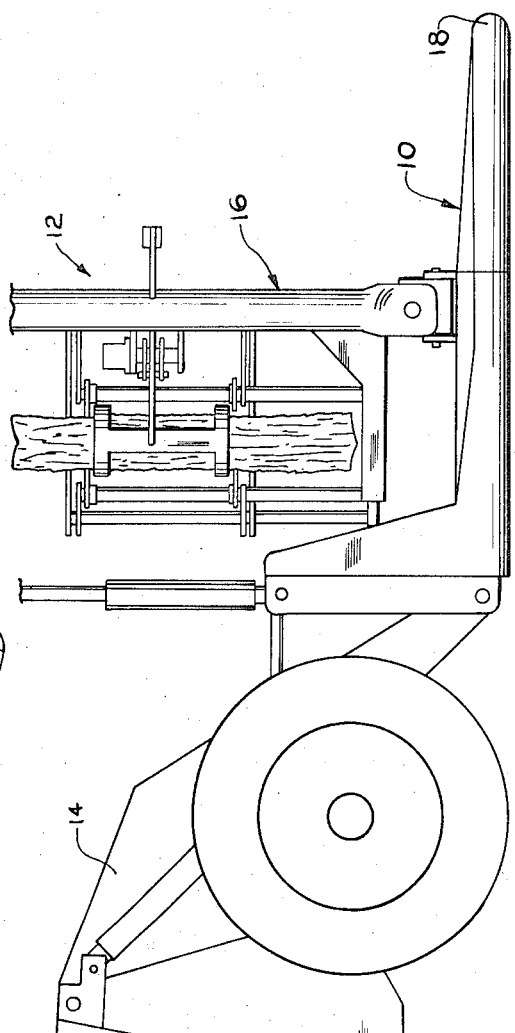

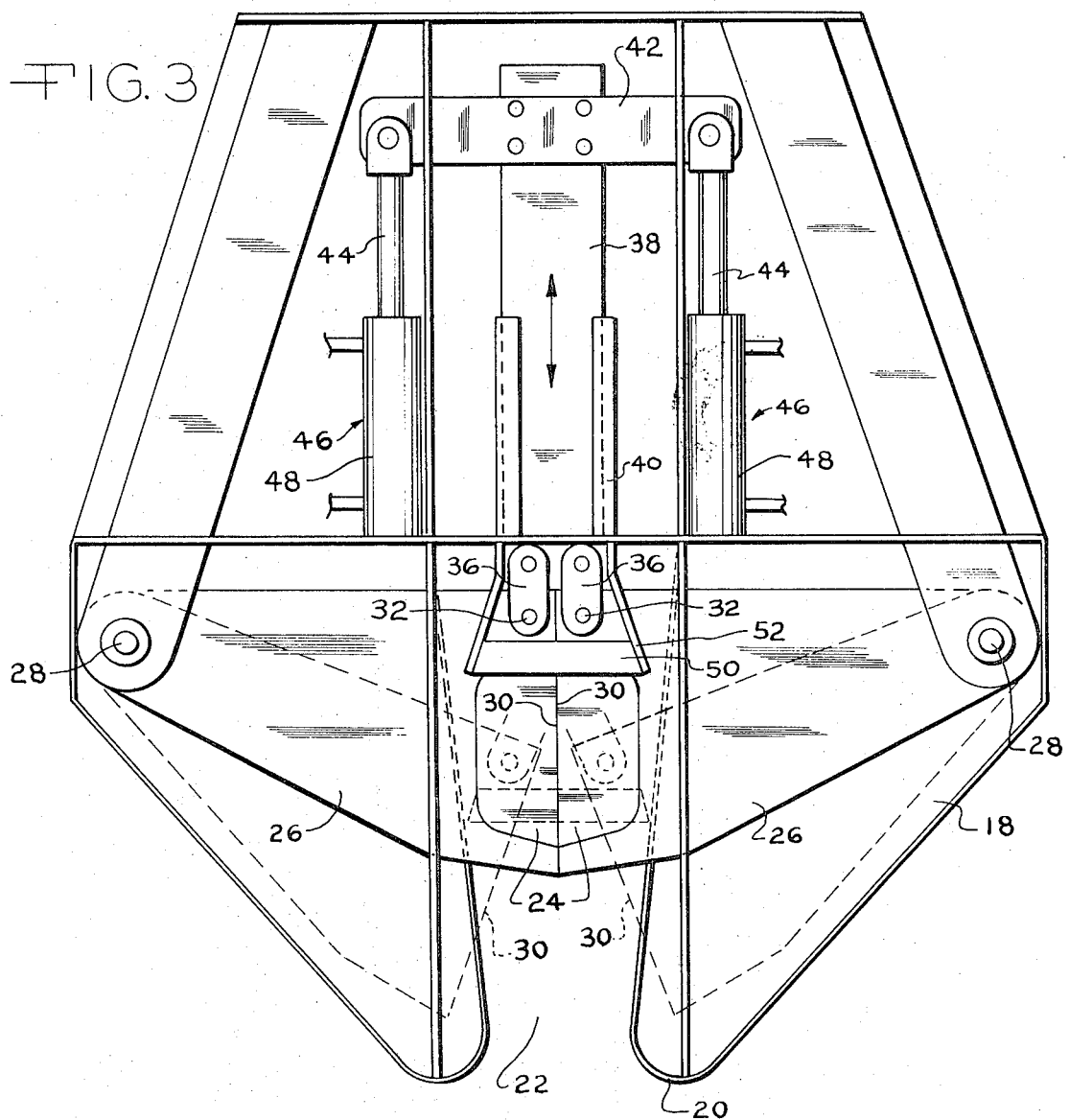

3,807,472

SHEAR MECHANISM FOR TIMBER HARVESTING MACHINE

CROSS REFERENCE TO RELATED APPLICATION

The shearing mechanism which forms the subject matter of this application is an improvement on the mechanism shown in my prior copending application Ser. No. 29,109 filed Apr. 16, 1970, now abandoned.

BACKGROUND OF THE INVENTION

Various shearing mechanisms have heretofore been devised for mounting on a vehicle for the purpose of cutting trees. Examples of such devices are shown in U.S. Pat. Nos. 2,214,334, 2,529,934 and 3,122,184. However, none of the prior devices provided for a sufficiently strong shear blade mounting to enable use of the mechanism to rapidly cut pulp wood timber which is of a diameter in the range of 5 to 7 inches at breast height. Furthermore, the prior devices have not incorporated the necessary power assist for the blades in a manner such that the blades can rapidly cut timber of this size. It is an object of the present invention, therefore, to provide an improved shear mechanism for timber harvesting machines.

SUMMARY OF THE INVENTION

A shear mechanism mounted on the forward end of a vehicle. The mechanism consists of a forwardly extending generally horizontal main frame having a rearwardly extending opening in the front end of predetermined width. A pair of shear blades are pivotally mounted on the frame on opposite sides of the opening and have cutting edges located within the opening. The blades are pivotally movable between open positions in which the cutting edges diverge in a forward direction in the opening and a closed position in which the edges are in substantial engagement with each other. When the forwardly moving vehicle locates a tree within the main frame opening, so that the tree exerts rearward pressure on the blades, a power assist mechanism is actuated to insure closing movement of the blades as the vehicle is moved forwardly. In one form of the invention, the blades have serrated edges which are constructed so that they first spread the tree fibers prior to shearing of the fibers, it having been found that this combination spreading and shearing action makes it possible to cut the tree with the application of a smaller force. The shear mechanism of this invention is thus capable of rapidly and efficiently cutting trees of pulp wood size.

Further objects, features and advantages of this invention will become apparent from a consideration of the following description, the appended claims, and the accompanying drawing in which:

FIG. 1 is a fragmentary side elevational view of a timber harvesting machine incorporating the shear mechanism of this invention;

FIG. 2 is a perspective view of the shear mechanism of this invention;

FIG. 3 is a top plan view of the shear mechanism of this invention showing the blades in closed positions in solid lines and in open positions in broken lines;

FIG. 4 is a transverse sectional view of the shear mechanism of this invention;

FIG. 5 is a diagrammatic view of a power assist cylinder showing the relation thereof to actuating switches therefor in positions of the cylinder corresponding to open and closed positions of the blades; and FIG. 6 is a fragmentary perspective view of a pair of shear blades in the mechanism of this invention illustrating a modified shape for the cutting edges of the blades.

With reference to the drawing, the shear mechanism of this invention, indicated generally at 10, is illustrated in FIG. 1 forming a part of a timber harvesting machine indicated generally at 12. The machine 12 consists of a forwardly movable vehicle 14 having a tree severing and processing assembly 16 mounted on the front end thereof. The shear mechanism 10 forms a part of the assembly 16, the remaining details of which form no part of this invention and are shown and described in the aforementioned copending patent application.

The shear mechanism 10 consists of a main frame 18 which extends forwardly from the vehicle 14 and is generally horizontal. The main frame 18 is provided at its front end 20 with a rearwardly extending opening 22 of predetermined width to thus limit the size of trees that can enter the opening 22 in response to forward vehicle movement. A pair of shear blades 24 are mounted so that they extend into the opening 22. The blades 24 are mounted on reinforcing frames 26 which are pivotally supported on pins 28 carried by the main frame 18. As a result, the blades 24 are movable between the closed positions shown in solid lines in FIG. 3 and the open positions shown in broken lines in FIG. 3.

The blades 24 have cutting edges 30 which diverge in a forward direction within the opening 22 in the open positions of the blades 24. In the closed positions of the blades 24, the cutting edges 30 are substantially parallel and are adjacent each other. Adjacent their rear edges, the blades 24 are connected by pivot pins 32 to the forward ends of links 36 which are pivotally mounted at their rear ends on a slide plate 38. A rearwardly extending track 40 supports the slide plate 38 for forward and rearward sliding movement on the main frame 18.

A cross bar 42 is secured to the rear end of the slide plate 38. The cross bar 42 is also connected to the piston rods 44 for hydraulic cylinder assemblies 46 disposed on opposite sides of the slide plate 38. The cylinder assemblies 46 have their cylinders 48 secured to the main frame 18. Thus, with the blades 24 in their open positions, rearward movement of the slide plate is operable to move the blades 24 to their closed positions. The cylinder assemblies 46 constitute a power assist for moving the slide plate 38 rearwardly. Conversely, the cylinder assemblies 46 are also reversely operable to move the blades 24 from their closed to their open positions.

In the operation of the shear mechanism 10, assume that the blades 24 are in their open positions and that the vehicle 14 is being moved forwardly. A tree is moved into the opening 22 by forward movement of the vehicle 14. If the tree is of a large enough size, it will engage the blade cutting edges 30 so that continued forward movement of the vehicle causes the tree to exert rearward forces on the blades 24 tending to close the blades 24. In the event the tree is of a smaller size, it will first engage a bumper bar 50 which is secured by supporting straps 52 to the slide plate 38 at a position such that it extends across the cutting edges 30 in the open positions of the blades 24.

In both cases, forward movement of the vehicle 14 causes rearward movement of the slide plate 38 which in turn causes movement of a switch actuating member 54 (FIG. 5) on the cross bar 42 relative to a first switch 56 sufficiently to actuate the switch 56 which in turn provides for extension of the piston rods 44 in a rearward direction. Thus, the cylinder assemblies 46 now perform their power assist function in moving the blades 24 to their closed positions. When the blades 24 have closed so as to sever the tree, the switch actuating member 54 has been moved to the dotted line position shown in FIG. 5 in which it actuates a switch 58. Actuation of the switch 58 causes the cylinder assemblies 46 to retract to in turn move the blades 24 to their open positions and return the switch actuating member 54 to its solid line position shown in FIG. 5. The above sequence is then repeated for subsequent trees. Because the cutting action of blades 24 is achieved in conjunction with the rearward movement of the tree against the cutting edge 30 or the bumper bar 50, the cut can be made without stopping the forward progress of the vehicle 14. This feature in turn eliminates the necessity of start-stop operation of the vehicle 14.

In FIG. 6, a modified form of blades 24a is illustrated, the blades 24a being identical to the blades 24 except that the blades 24a have serrated cutting edges 60. Each edge 60 has a plurality of substantially V-shaped notches 62, each of which is comprised of a pair of outwardly diverging leg surfaces 64. Each of the surfaces 64 is generally triangular in shape and terminates at its outer end in an upright edge 66. The inner end of each surface 64 is a shearing point 68. Each of the leg surfaces 64 is bounded on its top and bottom sides by generally triangular inclined surfaces 70. In operation of the blades 24a, the edges 66 enter the tree from opposite sides and function to spread the tree fibers which extend vertically in the tree. These fibers are more easily cut when separated and the shearing points 68 function with the inclined leg surfaces 64 to provide for a progressive shearing of the fibers following fiber spreading by the edges 66. Thus, improved shearing efficiency is obtained with the blades 24a.

What is claimed is:

1. In a timber harvesting machine which includes a forwardly movable vehicle, a shear mechanism mounted on the forward end of said vehicle and comprising a forwardly extending generally horizontal main frame having a rearwardly extending opening in the front end thereof of predetermined width, a pair of shear blades pivotally mounted on said frame on opposite sides of said opening and having cutting edges located within said opening, said blades being pivotally movable between open positions in which said edges are located in a forwardly diverging relation in said opening and closed positions in which said edges are substantially parallel and adjacent each other in said opening, said blades having the forward ends thereof spaced apart a distance greater than said predetermined width in said open position of said blades so that said forward ends of the blades are positioned on opposite sides of said opening in said open positions of said blades.

2. A shear mechanism according to claim 1 further including a generally horizontal slide member slidably mounted on said frame at a position rearwardly of said blades, a pair of links pivotally connecting said slide member and said blades such that on rearward movement of said slide member said blades are moved toward said closed positions and on forward movement of said slide member said blades are moved toward said open positions, and power means connected to said slide member and operable to move said slide member rearwardly and forwardly.

3. A shear mechanism according to claim 1 wherein each of said cutting edges is of serrated construction having a plurality of substantially V-shape notches comprised of outwardly diverging leg surfaces, each of said leg surfaces terminating at the outer end thereof in a substantially vertical edge and at the inner end thereof in a shearing point.

4. A shear mechanism according to claim 3 wherein each of said leg surfaces is of a decreasing width in an inward direction and is bounded on the top and bottom sides thereof by generally triangular inclined surfaces.

5. A shear mechanism according to claim 2 wherein said power means comprises a pair of fluid actuated cylinder assemblies mounted on said main frame and disposed on transversely opposite sides of and connected to said slide member.

6. A shear mechanism according to claim 2 further including a bumper bar connected to said slide member and positioned to extend across said blade edges.

7. A shear mechanism according to claim 2 further including first and second switch means on said main frame, and means connected to said slide member operable to actuate said first switch means in response to movement of said blades from said open positions toward said closed positions, said last mentioned means being operable to actuate said second switch means in response to movement of said slide member to a position corresponding to said closed positions of said blades, said power means being operable to move said slide member rearwardly in response to actuation of said first switch means and being operable to move said slide member forwardly in response to actuation of said second switch means.

* * * * *